United States Patent [19]

Smith

[11] Patent Number: 4,821,965

[45] Date of Patent: Apr. 18, 1989

[54] SELF-LEVELING DROPPED WHEEL-LINE IRRIGATION APPARATUS

[76] Inventor: Ann J. Smith, HC 79 Box 2175, Oreana, Id. 83650

[21] Appl. No.: 182,636

[22] Filed: Apr. 18, 1988

[51] Int. Cl.⁴ .................. A01G 25/09; B05B 3/04; B05B 3/18; B05B 15/06
[52] U.S. Cl. .................................. 239/741; 239/273
[58] Field of Search ............ 239/741, 722, 723, 726, 239/273, 275, 737, 735, 734

[56] References Cited

U.S. PATENT DOCUMENTS

| | | | |
|---|---|---|---|
| 3,002,697 | 10/1961 | Jones | 239/741 |
| 3,045,922 | 7/1962 | Jensen | 239/741 |
| 3,143,298 | 8/1964 | Jones | 239/741 |
| 3,193,204 | 7/1965 | Walton et al. | 239/726 |
| 3,603,508 | 9/1971 | Ingram | 239/741 |
| 3,856,039 | 12/1974 | Courtright | 239/741 |
| 4,204,643 | 5/1980 | Cornelius | 239/741 |
| 4,382,556 | 5/1983 | Hunter | 239/741 |
| 4,700,897 | 10/1987 | Smith et al. | 239/741 |

FOREIGN PATENT DOCUMENTS 0248043  7/1987  Fed. Rep. of Germany ...... 239/726

Primary Examiner—George E. A. Halvosa
Assistant Examiner—Christopher G. Trainor
Attorney, Agent, or Firm—Paul F. Horton

[57] ABSTRACT

Wheel line irrigation apparatus provided with a plurality of rotary, impact-type, high volume sprinklers, mounted on trunk lines each of which are self leveling. The pipeline is axially affixed to laterally spaced wheels; the pipeline including a main line, having a substantially horizontal longitudinal axis, and a plurality of dropped line portions defining cradle-like structures. A series of trunk lines, in fluid communication with the pipeline and rotatably connected to the pipeline by support bearings, are nestled within the cradles. Each of the trunk lines is provided with a sprinkler, rotatable about a vertical axis. The sprinklers are maintained in the upright position, even when the pipeline is on uneven ground, as the trunk lines pivot within the cradles because of the low center of gravity. The inlet port of each nozzle is located at or below the longitudinal axis of the main line to hold oscillations to a minimum. Each of the dropped pipeline sections may be provided with a downwardly depending pedestal, with foot for engaging the ground, once the pipeline is filled with irrigation water, to support the pipeline and to dissipate the energy of the impact arm to ground to prevent oscillation of the pipeline.

14 Claims, 1 Drawing Sheet

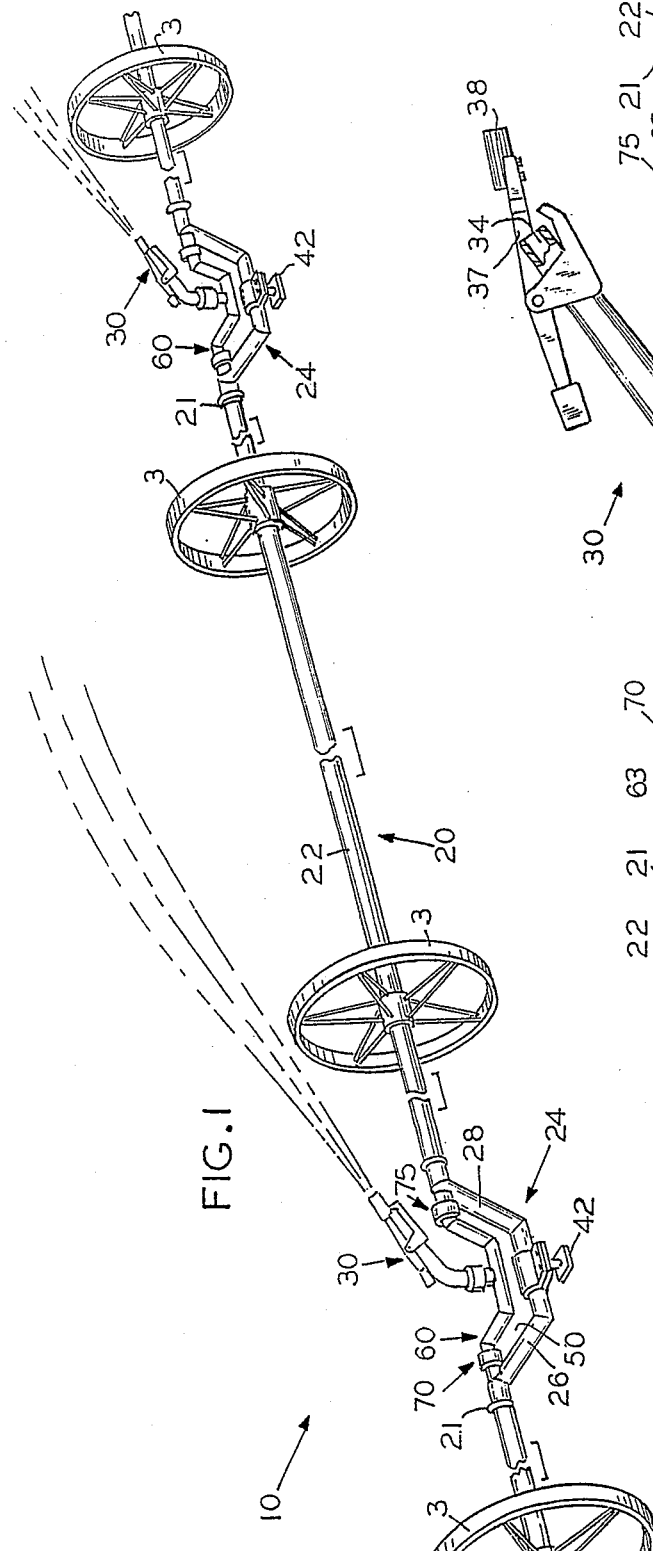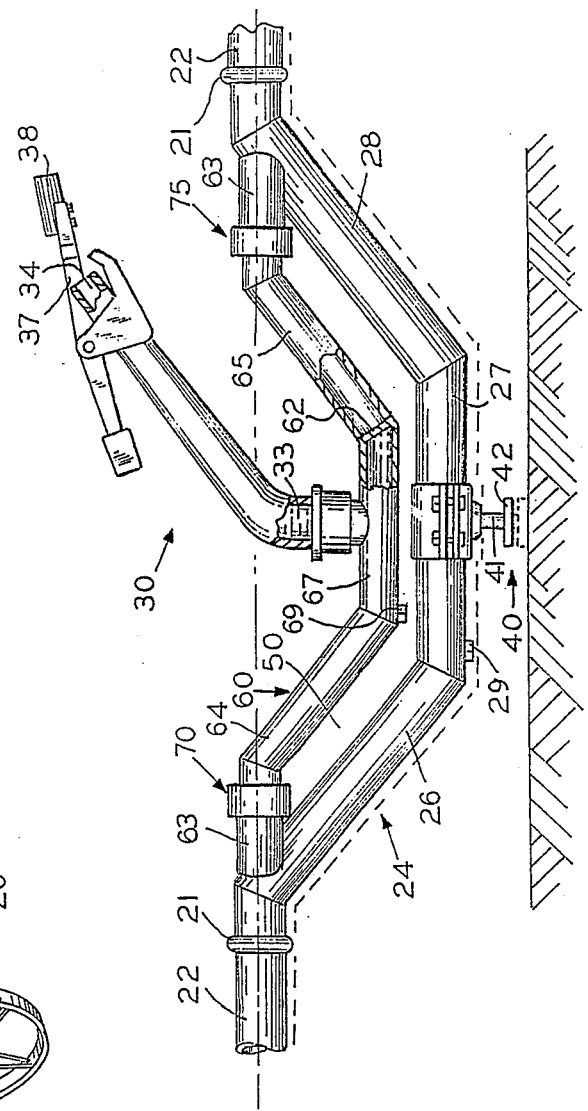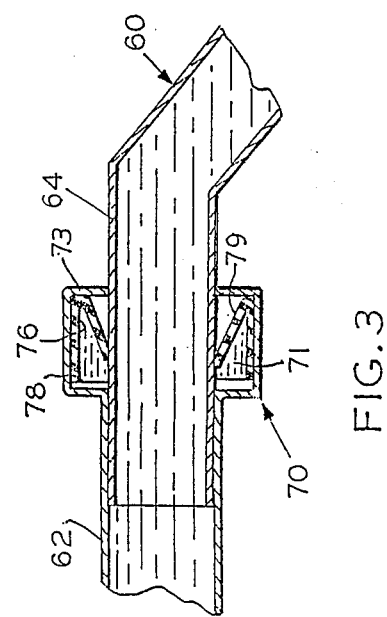

SELF-LEVELING DROPPED WHEEL-LINE IRRIGATION APPARATUS

BACKGROUND OF THE INVENTION

1. Field of the Invention

This invention relates in general to wheel line irrigation systems; particularly to dropped line systems; and even more particularly to systems with self leveling sprinklers.

2. Description of the Prior Art

Wheel line irrigation systems are well known in the art and are widely used in arid parts of the country for sprinkler irrigation of large areas. A conventional wheel line system includes a series of laterally spaced wheels which carry an irrigation pipeline, on the top of which are mounted a series of sprinklers; each sprinkler operable to cover a circular area of 60 feet in diameter, or an area of approximately 2,826 square feet. The sprinklers are placed 40 feet apart for overlap. The wheel line may be manually moved or self propelled.

Also in the art is a sprinkler of high volume and long reach known under the registered trademark as BIG GUN ®. Such a sprinkler is of the rotary, arm-impact type having a nozzle discharge port of 0.5" or larger. Because of the water demand for such a sprinkler; the torque placed on the pipeline by reactive thrust; and oscillations due to the impact of the high pressure, high volume stream on the impact arm, the sprinkler is presently located only at the terminal outlet end of a conventional sprinkler system, closely adjacent to a support wheel. Mounting of such a sprinkler elsewhere on the pipeline causes destruction of the line because of the effect of the torque and oscillation on the line. The BIG GUN ® type of sprinkler covers a circular area of 250 feet in diameter, or an area of approximately 49,000 square feet—some 17 times the area of conventional sprinklers. U.S. Pat. No. 4,700,897, issued to Alvin, Daren, and Reed Smith, provides an irrigation system in which high volume, large coverage sprinklers may be used. The Smith device, however, includes sprinklers mounted directly on the dropped line portion of the pipeline. In that the ground contour may be uneven and in that the sprinklers are fixed in position, the sprinklers may be in such an angle relative to ground so as to impact the ground causing erosion of the soil while, at the same time, not providing adequate coverage of the land to be irrigated.

U.S. Pat. No. 3,045,922, issued to A. E. Jensen, discloses a self leveling system utilizing a stub pipe to position the sprinkler from a horizontally extending pipeline so that the sprinkler can revolve about the pipeline in planetary fashion. Such self leveling structure cannot be used with high volume, long reach sprinklers, due to the high relative thrust and oscillations due to the impact of the high pressure stream on the impact arm. The Jensen device is also not suitable for high volume sprinklers in having a sprinkler connected to the main line by only a single pivot; and in having a sprinkler having a nozzle intake port which must be located above the longitudinal axis of the main line.

SUMMARY OF THE INVENTION

The present invention overcomes the problems of line weight; torque; oscillation; and self leveling, by providing a wheel line irrigation system which provides dropped line portions of the pipeline, each of which define a cradle; and a plurality of rotatable, self-leveling trunk lines, each of which are received within a respective cradle, onto which sprinklers of the rotary impact type, having a discharge nozzle port of 0.5" or greater, are mounted. The trunk lines, in cooperation with the dropped lines, permit water discharge so that the thrust of the discharge is at or below and preferably in alignment with the longitudinal axis of the adjacent main line. The dropped line portion is provided with a pedestal for supporting the line and for assistance in absorbing the jar of the impact arm to prevent oscillation. A more thorough and comprehensive description of the apparatus may be found in the appended claims.

It is therefor a primary object of the present invention to provide a wheel line irrigation system having self-leveling rotary impact-type sprinklers having a nozzle discharge port of 0.5" or greater for vastly improved coverage while holding sprinkler caused erosion to a minimum.

More particularly, it is an object of the present invention to provide a wheel line irrigation system utilizing impact-type sprinklers having a nozzle discharge port of 0.5" or greater by providing dropped portions of the line which are immovably secured to the main line and by providing trunk lines, rotatably receivable within the cradles defined by the dropped lines, for mounting of the sprinklers at or below the longitudinal axis of the main line to reduce torque on the line from the reactive thrust of the discharged water and to reduce oscillations.

Another object of the present invention is to provide a pedestal under the dropped portion of the pipeline for support of the line when the line is filled with water and for transmitting energy generated by the impact arm of the sprinkler to ground to prevent oscillation of the pipeline.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a perspective view of the wheel line irrigation system of the present invention.

FIG. 2 is a side elevation of a dropped portion of the pipeline, showing the trunk line, rotatably nestled within the cradle defined by the dropped portion, and showing the location of the sprinkler nozzle relative to the longitudinal axis of the main line, illustrated by a dotted line.

FIG. 3 is a sectional side elevation of the support bearing and seal by which a trunk line is connected to the main line.

DETAILED DESCRIPTION OF THE INVENTION

Referring now to the drawings, and, more particularly, to FIGS. 1 and 2, an embodiment to be preferred of a wheel line irrigation system 10 made according to the present invention is disclosed. System 10 includes a plurality of laterally spaced wheels 3; an elongated pipeline 20, carried by the wheels; a plurality of trunk lines 60 carried by the pipeline; and a plurality of sprinklers 30, each mounted on a trunk line.

Wheels 3 are conventional in the art and are preferably of the spoked, steel rim, type having a diameter of five feet. The wheels are laterally spaced approximately forty feet apart. Secured to the wheels, at the axes of the wheels, so as to be rotatable therewith is pipeline 20. The pipeline is preferably constructed of aluminum and is from four to six inches in diameter. It is contemplated that smaller diameter pipe could be used with the inclusion of valves, not shown, for restricting the flow of water to selected sprinklers.

Pipeline 20 includes a main line, designated generally by the numeral 22 and a plurality of dropped lines, designated by the numeral 24, each defining a cradle 50. The dropped lines are spaced at selected intervals along the length of the main line, preferably one hundred fifty feet apart. The dropped lines, as the name indicates, are located below the main line and are preferably aligned and in a vertical plane therewith. The dropped lines may be constructed to include a horizontal conduit 27, approximately one foot below and parallel with the main line and a pair of oppositely disposed diverging elbow conduits 26 and 28, affixed to the horizontal conduit and either end thereof and affixed to adjacent portions of the main line so as to be in fluid communication therewith. Couplings 21 may be used to secure the dropped lines 24 to the main line 22. The angle of divergence of the elbows and the length of conduit 27 must be such that there may be unobstructed 360° rotation of sprinkler 30. Horizontal conduit 27 is provided with an automatic drain plug 29 for draining the system.

Mounted to each dropped line 24, and downwardly depending therefrom, is a pedestal 40. Pedestal 40 includes a standard 41 and a foot member 42 for engaging the ground, once the pipeline is filled with water. The pedestal is short enough so as to not touch the ground when the pipeline is empty. This is to allow rotation of the wheels with attached pipeline for moving the system from one sprinkling location to another without contact between the pedestal and the ground. The pedestal may be attached to the dropped line by means of a bracket or by other conventional means.

Each of the trunk lines 60 is formed much in the manner of a respective dropped line 24, preferably constructed of aluminum tubing of less diameter than the main line, and nestled within the cradle defined by the dropped line for rotation. In the preferred embodiment each trunk line includes a pair of tubular elbows 64 and 65; and a horizontal conduit 67, extending between the elbows. Horizontal conduit 67 is provided with a plug 62 which prevents irrigation water from entering elbow 65 and is also provided, on its lowermost portion, with a drain plug 69 for draining of the trunk line. Each trunk line is connected to the main line by a stub portion, designated in the drawings by the numeral 63.

Stub portion 62 is in fluid communication with main line 22 and has a horizontal axis in alignment with, i.e., coaxial with the axis of a respective main line 22, to which it is attached. Stub portion 63 is also tubular in construction and is affixed to mainline 22, having a horizontal axis also coaxial with the main line to which it is attached. Stub portion 63, however, is not in fluid communication with the mainline and is either affixed by welding to the surface of the mainline, or in the alternative may be provided with a plug, not shown.

Each of the tubular elbows 64 and 65 is connected to a respective stub by a support bearing. First support bearing 70, shown to advantage in FIG. 3, permits elbow 64 to ride within stub portion 62 and includes an annular resilient sealing gasket 76 contained within a housing 73. Gasket 76 includes an external ring 78 and a cone-shaped member 79, connected thereto, defining a space 71 therebetween. Water, which leaks about the engaging surfaces of stub 62 and elbow 64, builds up a pressure in space 71 causing cone member 79 to snugly engage the elbow to prevent external leakage. It is obvious that a bearing utilizing O-rings, as demonstrated in the Jensen disclosure, may likewise be used. A second support bearing 75 permits elbow 65 to rotate upon stub 63. While a bearing, as above described, may also be used for the pivotal connection of elbow 65 to stub 63, in that second support bearing 75 need not contain a sealant gasket, any expedient type of bearing may be used which allows rotation. Further, while the second support bearing is shown being mounted between the elbow and a stub portion, the second bearing may be supported by brackets, not shown, upwardly extending from the dropped line; it only being necessary that the bearing be coaxial with the first bearing. It will be seen, then, that each trunk line 60 extends below adjacent horizontal sections of main line 22 and above a respective dropped line section 24 to rotate within cradle 50. The trunk line, by its own weight and the weight of water contained within, has a center of gravity lower than the support bearings, and therefore rotates to a position in a vertical plane to ground with the horizontal axis of the main line. Weights may be added to the trunk line to assist in self leveling, if desired.

Sprinklers 30 are of the rotary, impact type, having a single primary nozzle which discharges water in one direction only at any particular time. Such a sprinkler is currently marketed under the trademark, BIG GUN ®. Each sprinkler includes a nozzle 32 having an inlet port 33 and a discharge port 34 and also includes an impact arm 37 with a drive spoon 38 for engaging the high pressure stream of water exiting from the discharge port of the nozzle, for rotation of the nozzle. Sprinkler 30 is mounted by any suitable connection to the top surface of horizontal conduit 67 of trunk line 60. It is an important part of the invention that the inlet port 33 of the nozzle be at or below the longitudinal axis of stub 62 of the main line and that the stub be substantially coaxial with main line 22 to prevent excessive oscillation of the trunk line about its bearings. It is also an important aspect of the invention that the trunk line and sprinkler be within the cradle in that the dropped line and main line are affixed to the wheels so as to rotate therewith when moving the line from one location to another. In this manner, should the bearings, in being "dry" fail to rotate, no damage to the sprinklers will result.

To give some perspective to the area of coverage of the large nozzle sprinklers utilized in the present invention, having nozzles of at least 0.5" in diameter and operating at pressures of 40 to 100 psi, the conventional sprinkler covers a diameter of approximately 60 feet in diameter, i.e. approximately 2,326 square feet, while the sprinklers utilized in the present invention cover an area approximately 250 feet in diameter and approximately 49,000 square feet.

For operation, the wheel line irrigation system 10 of the present invention is first located at an area desired to be irrigated. The wheels are placed at such a position that the pedestals 40 and sprinklers 30 are all in a vertical position. Valves, if present, are then manipulated to control the sprinklers to be operated. In the system described, and in a system actually used, the pipeline is 1320', i.e. one-quarter mile, in length, with the wheels being spaced at forty foot intervals and the sprinklers, mounted on the trunk lines, at 150' intervals for sufficient overlap. Once in place, irrigation water is turned into the pipeline; the weight of the water causing a flexing of the aluminum pipeline and causing the support pedestals 40 to engage the ground by means of foot members 42 and causing each trunk line 60 to seek its lowest level and hence causing the sprinklers to assume a vertical position relative to ground. As water is forced through each sprinkler 30, the torque produced by the reactive thrust of the discharging water is held to a minimum because the inlet port of the nozzle, the point of nozzle angulation from its vertical mount, is at the approximate axis of the main line and the support bearings. The sprinklers are free to rotate without obstruction and the sprinklers, being spaced from the wheels 3, project a stream of water which is unimpeded by close structural elements such as wheels or pipeline. The impact arms 37, driven by the water discharge, which would ordinarily cause severe oscillation of the pipeline, has its energy dissipated and dampened by the pedestal's contact with the ground. The pedestals also provide desired support to insure the structural integrity of the pipeline. Once the irrigation is completed, the wheel line system 10 is drained and moved to a new area either manually or by drive means, not shown. When irrigation is completed for the set, drain plugs 29 and 69 are opened and the lines drained to aid in moving to a new location.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Self leveling dropped line irrigation apparatus comprising:
   a plurality of laterally spaced wheels;
   an elongated pipeline suspended by and between said wheels, said pipeline defining a plurality of adjacent main line sections each having a substantially horizontal longitudinal axis, and a plurality of dropped line sections, each dropped line section extending between and below said adjacent main line sections to define a substantially U-shaped cradle;
   a plurality of trunk lines, each trunk line in fluid communication with and mounted upon said pipeline by first bearing means allowing for free rotation of said trunk line about the horizontal axis of said bearing means, wherein each trunk line extends below said, adjacent main line sections and above its respective dropped line section; and
   a plurality of sprinklers, each of said sprinklers rotatably mounted about a vertical axis on the top surface of one of said trunk lines; the center of gravity of each sprinkler and its respective trunk line being such as to hold said sprinkler in an erect, upright position within its respective cradle.

2. The apparatus as described in claim 1 wherein each of said sprinklers includes at least one nozzle, each nozzle having an inlet port and a discharge port, the inlet port of each nozzle being located at or below the horizontal axis of said first bearing means by which it is supported.

3. The apparatus as described in claim 2 wherein each of said first bearing means is coaxial with the longitudinal axis of said main line sections of said pipeline.

4. The apparatus as described in claim 1 further comprising second support bearing means mounted on said pipeline working in cooperation with each of said first bearing means to pivotally support each respective trunk line.

5. The apparatus as described in claim 1 wherein the height of each of said sprinklers mounted on each of said trunk lines is less than the height of each of said wheels for clearing the ground upon rotation of said wheels.

6. The apparatus as described in claim 1, wherein each of said trunk lines include at least one elbow conduit connected to and in fluid communication with one of said adjacent main line sections, and a horizontal conduit connected to said elbow for mounting one of said sprinklers thereon for unobstructed rotation of said sprinkler.

7. The apparatus as described in claim 1, wherein said wheels are immovably secured to said pipeline for rotation therewith.

8. The apparatus as described in claim 1 further comprising a plurality of pedestals, each of said pedestals downwardly depending from each of said dropped line sections for supporting the respective dropped line sections when filled with water.

9. Self leveling dropped line irrigation apparatus comprising:
   a plurality of laterally spaced wheels;
   an elongated pipeline suspended by and between said wheels, said pipeline defining a plurality of adjacent main line sections each having a substantially horizontal longitudinal axis, and a plurality of dropped line sections, each dropped line section extending between and below said adjacent main line sections to define a substantially U-shaped cradle;
   a plurality of trunk lines, each trunk line in fluid communication with and mounted upon said pipeline by first bearing means having an axis substantially coaxial with the longitudinal axis of said main line sections for free rotation of said trunk line and each trunk line extending below said adjacent main line sections and above each respective dropped line section; and
   a plurality of sprinklers, each of said sprinklers rotatably mounted about a vertical axis on the top surface of one of said trunk line; the center of gravity of each sprinkler and its respective trunk line being such as to hold said sprinkler in an erect, upright position within its respective cradle, and each of said sprinklers including at least one nozzle, each nozzle having an inlet port and a discharge port, the inlet port of each nozzle being located at or below the horizontal axis of said first bearing means by which it is supported.

10. The apparatus as described in claim 9 further comprising second support bearing means mounted on said pipeline working in cooperation with each of said first bearing means to pivotally support each respective trunk line.

11. The apparatus as described in claim 10 wherein each of said trunk lines includes two elbow conduits connected to said adjacent main line sections and supported by said first and second support bearing means, respectively, wherein at least one of said elbows is in fluid communication with one of said adjacent main line sections and wherein each of said trunk lines is provided with a horizontal conduit connected to and between said elbows for mounting one of said sprinklers thereon for unobstructed rotation of said sprinkler.

12. The apparatus as described in claim 9 wherein the height of each of said sprinklers mounted on each of said trunk lines is less than the height of each of said wheels for clearing the ground upon rotation of said wheels.

13. The apparatus as described in claim 9, wherein said wheels are immovably secured to said pipeline for rotation therewith.

14. The apparatus as described in claim 9 further comprising a plurality of pedestals, each of said pedestals downwardly depending from each of said dropped line sections for supporting the dropped line sections when filled with water.

* * * * *